United States Patent [19]

McSparran

[11] Patent Number: 4,983,870

[45] Date of Patent: Jan. 8, 1991

[54] RADIAL MAGNETIC BEARING

[75] Inventor: Lloyd W. McSparran, Pittsburgh, Pa.

[73] Assignee: Contraves Goerz Corporation, Pittsburgh, Pa.

[21] Appl. No.: 385,798

[22] Filed: Jul. 26, 1989

[51] Int. Cl.⁵ ............................................. F16C 39/00
[52] U.S. Cl. .................................. 310/90.5; 310/216; 310/258
[58] Field of Search ..................... 310/90.5, 254, 258, 310/259, 216; 361/143

[56] References Cited

U.S. PATENT DOCUMENTS

| | | | |
|---|---|---|---|
| 3,155,437 | 11/1964 | Kinsey | 361/143 |
| 3,787,100 | 1/1974 | Habermann et al. | 308/10 |
| 3,937,533 | 2/1976 | Veillette | 310/90.5 |
| 4,012,083 | 3/1977 | Habermann et al. | 308/10 |
| 4,121,143 | 10/1978 | Habermann et al. | 318/629 |
| 4,244,629 | 1/1981 | Habermann | 308/10 |
| 4,473,259 | 9/1984 | Goldowsky | 308/10 |
| 4,504,098 | 3/1985 | Battarel | 310/90.5 |
| 4,652,820 | 3/1987 | Maresca | 310/90.5 |

FOREIGN PATENT DOCUMENTS

| | | | |
|---|---|---|---|
| 0223203 | 6/1985 | German Democratic Rep. | 310/90.5 |
| 0081217 | 5/1983 | Japan | 310/90.5 |
| 0113317 | 6/1984 | Japan | 310/90.5 |
| 0160626 | 7/1986 | Japan | 310/90.5 |

OTHER PUBLICATIONS

"Magnetic Bearings—The Ultimate Means of Support for Moving Parts in Space", by A. A. Robinson, Spacecraft Technology Department, ESA Technical Directorate, ESTEC, Noordwijk, Netherlands (publ. date is not known but is prior to the filing date of the subject application).

Primary Examiner—R. Skudy
Attorney, Agent, or Firm—John M. Adams

[57] ABSTRACT

A stator housing surrounds the portion of a rotor having a magnetic flux carrying member extending around the rotor within the stator housing. A plurality of electromagnets are supported by the stator around the periphery of the rotor oppositely of the magnetic flux carrying member. Each of the electromagnets includes a stacked arrangement of laminations having an E-shaped cross-sectional configuration. Each lamination includes a pole tip in close proximity to the surface of the magnetic flux carrying member to form an air gap. Magnetizing coils extend around the legs of the E-shaped laminations. When electrical current is supplied to the coils, magnetic forces are exerted upon the magnetic flux carrying member enabling the rotor to be positioned in a levitated state within the stator housing.

15 Claims, 6 Drawing Sheets

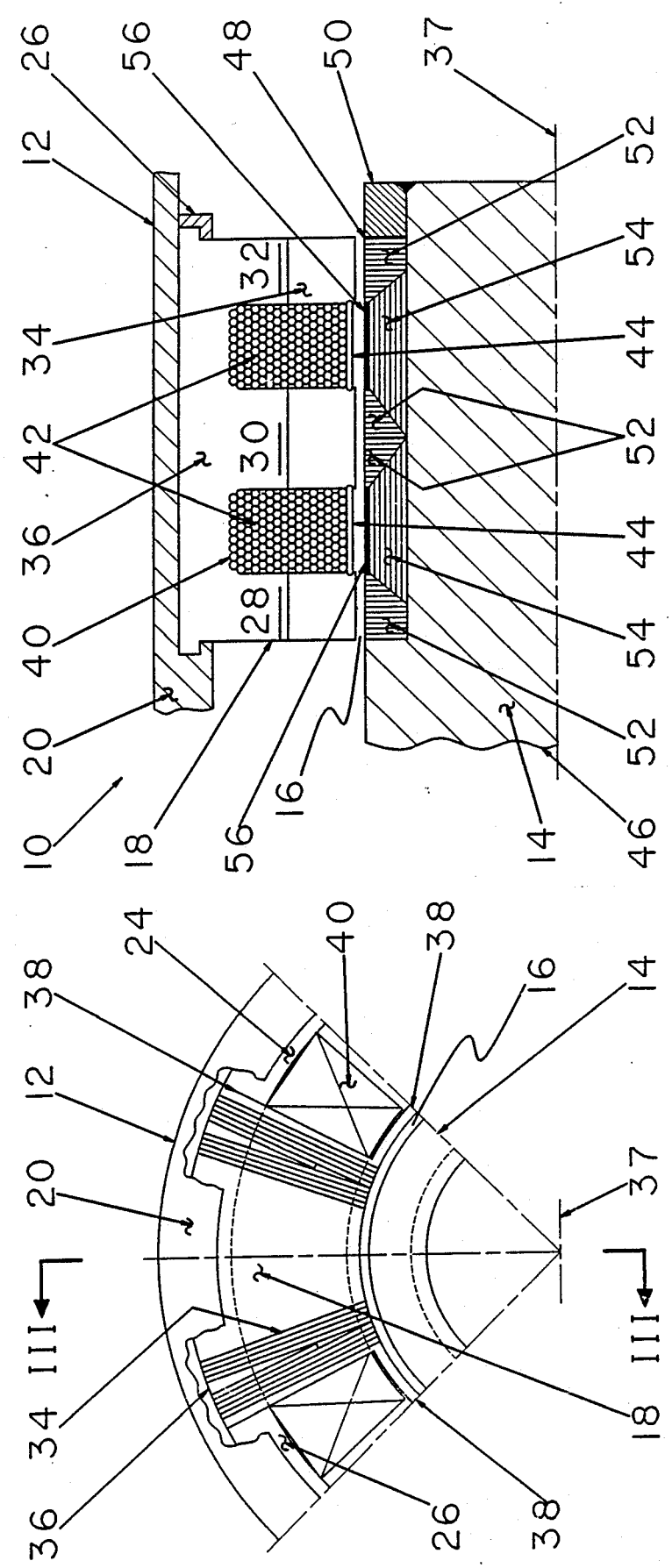

RADIAL MAGNETIC BEARING

BACKGROUND OF THE INVENTION

1. Field of the Invention

This invention relates to a magnetic radial force actuator and more particularly to a radial magnetic bearing for applying a magnetic force to a rotor within a stator assembly.

2. Description of the Prior Art

Magnetic bearings for rotatably supporting a rotor about an axis as well as to freely translate the rotor about its axis are well-known in the art as disclosed in U.S. Pat. No. 4,473,259. It is the principal advantage of a magnetic bearing to support the shaft in a manner that eliminates frictional wear and the corresponding need for lubricants.

A conventional magnetic bearing includes a series of electromagnets equally spaced around a rotor member having a ferrous outer ring in close proximity to the poles of the electromagnets. Forces are exerted on the rotor member by supplying currents to the coils wrapped around the poles of the electromagnets. It is also known that by adjusting the current in each electromagnet the forces exerted on the rotor can be brought into balance so that the rotor can be maintained in a levitated state.

A further example of a radial magnetic bearing is disclosed in U.S. Pat. No. 4,121,143 in which a rotor is supported in a stator by two radial magnetic bearing means, each having an electromagnet with eight windings mounted on the poles of the fixed armature. There is no contact between the rotor and the stator and therefore there is no friction. However, the flux orientation in the rotor undergoes a number of reversals in each revolution of the rotor. This results in a certain degree of resistance to motion by generating hysteresis losses in the rotor as the flux reverses in each element of the rotor as it passes from pole to pole. In addition, losses due to eddy currents induced in the rotor also have a retarding effect on the rotation of the rotor.

It has been suggested as disclosed in U.S. Pat. No. 4,012,083 to reduce the rotation retarding effects on the rotor associated with hysteresis and eddy current losses in a magnetic bearing by utilizing in the electromagnetic circuit a stator having at least one electromagnet of U-shaped cross section with the arms of the U forming north and south poles where the plane of symmetry separating the north and south poles lies perpendicular to the axis of rotation of the magnetic bearing.

While attempts have been made to substantially eliminate the frictional drag forces that are experienced with magnetic bearings due to hysteresis and eddy current losses in the rotor, the proposed construction of the rotor and stator elements are elaborate and are expensive to manufacture. Therefore there is need for a magnetic radial force actuator which is economically manufactured and efficient to the degree of substantially eliminating the effects of frictional drag forces on the rotor.

SUMMARY OF THE INVENTION

In accordance with the present invention there is provided a magnetic bearing for rotatably supporting a rotor element. A magnetic flux carrying member is carried by the rotor element. A stator element surrounds in spaced relation the magnetic flux carrying member. A plurality of at least three electromagnetics are supported by the stator element around the periphery of the magnetic flux carrying member to generate a force of attraction on the rotor element. Each electromagnet is formed by a plurality of planar laminations extending longitudinally parallel to the axis of rotation of the rotor element. EAch of the laminations has a plurality of legs forming pole tips positioned in close proximity to the surface of the magnetic flux carrying member to form an air gap therebetween. Magnetizing coils extend around the legs of the laminations. Power means supplies the magnetizing coils with electrical current to generate magnetic forces upon the magnetic flux carrying member. Further in accordance with the present invention there is provided a magnetic radial force actuator that includes a stator housing and rotor positioned relative to the stator housing. The rotor has a spherical surface. A magnetic flux carrying member extends around the rotor within the stator housing. A plurality of at least four electromagnets are supported by the stator housing and are spaced around the periphery of the rotor in overlying relation with the magnetic flux carrying member to generate forces of attraction on the rotor. Each of the electromagnets includes a structure formed by a stacked arrangement of laminations having an E-shaped cross-sectional configuration. The laminations are positioned radially around the rotor and form a plurality of pole tips positioned in close proximity to the surface of the magnetic flux carrying member to form an air gap therebetween. Magnetizing coils extend around the E-shaped laminations. Power means supplies the magnetizing coils with electrical current to generate a magnetic force upon the magnetic flux carrying member.

Accordingly, the principal object of the present invention is to provide a radial magnetic bearing with low rotational losses experienced by the rotor.

Another object of the present invention is to provide in a radial magnetic bearing an electromagnetic configuration which serves to substantially reduce frictional drag forces due to hysteresis and eddy current losses in the rotor.

An additional object of the present invention is to provide a magnetic radial force actuator that is efficiently manufactured to substantially eliminate frictional drag forces on the rotor.

Another object of the present invention, is to provide a radial magnetic bearing having an its electromagnets and associated rotor flux carrying member formed by laminated structures which facilitate rapid rates of flux change.

Another object of the present invention is to provide a radial magnetic bearing constructed in a manner to resist deflection due to magnetic forces and include a structure that prevents localized saturation due to the leakage component of flux.

These and other objects of the present invention will be more completely disclosed and described in the following specification, accompanying drawings, and appended claims.

BRIEF DESCRIPTION OF THE DRAWINGS

FIG. 2 is a schematic illustration of a radial segment of the magnetic bearing shown in FIG. 1.

FIG. 3 is a sectional view of the magnetic bearing taken along line III—III of FIG. 2. 5

DESCRIPTION OF THE PREFERRED EMBODIMENTS

Figure 1:
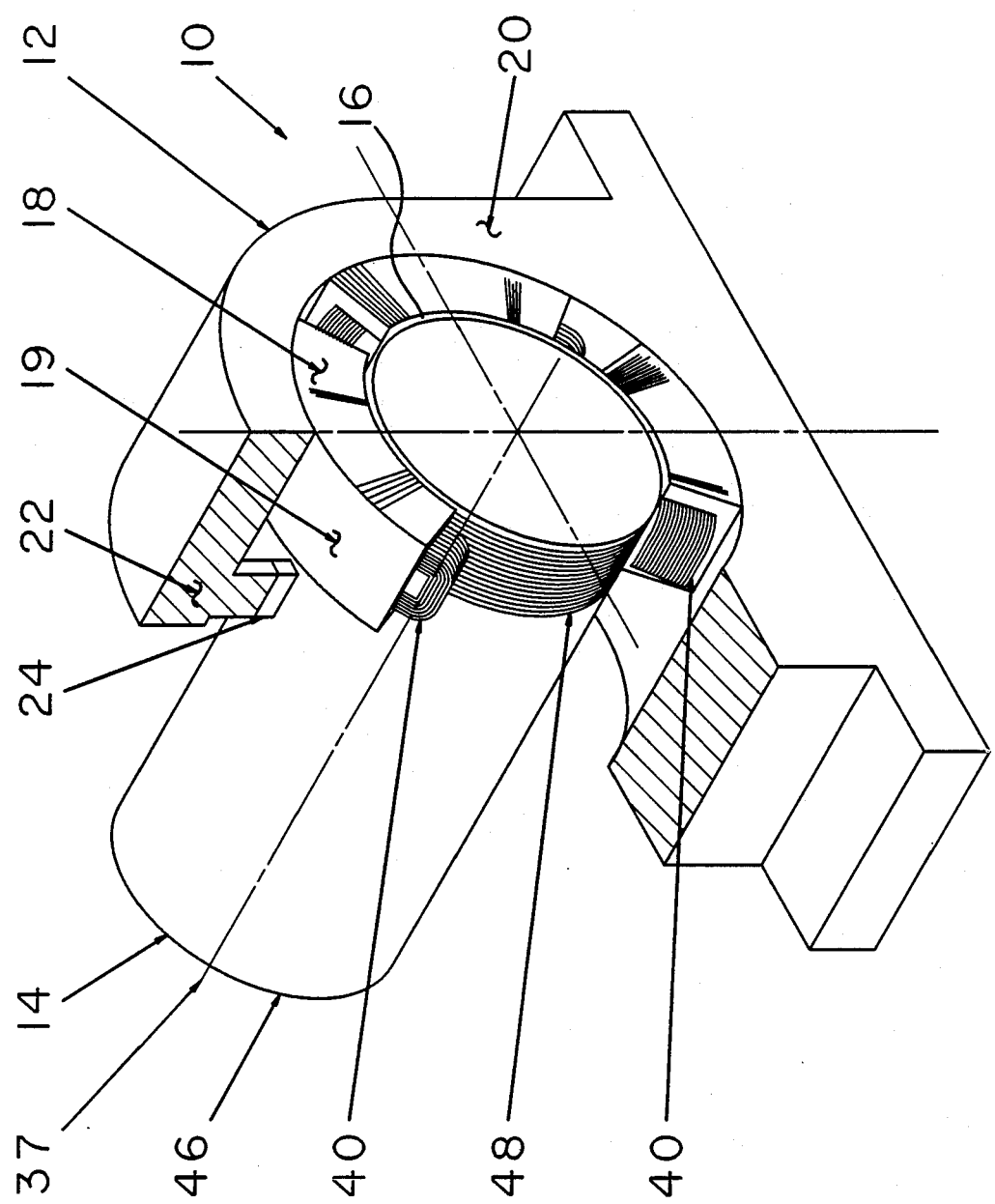
FIG. 1 is a fragmentary isometric view partially in section of a radial magnetic bearing.

Referring to the drawings and particularly to FIGS. 1-3, there is illustrated a radial magnetic bearing generally designated by the numeral 10 that includes a stator assembly 12 and a rotor assembly 14 with an air gap 16, as shown in FIG. 2, positioned therebetween. The stator assembly 12 includes at least three electromagnets 18 having an outer radial surface 19 and an inner radial surface in close proximity to the rotor assembly 14. At least three electromagnets 18 are required and arrangements of four or more electromagnets may be utilized to generate magnetic forces upon the rotor assembly 14. Surrounding the stator electromagnet 18 is a housing 20 having inwardly projecting leg portions 22 with an air gap sensing element 24 associated therewith, as shown in FIG. 1.

The air gap sensing element 24 is used to sense the position of the rotor assembly 14 within the air gap 16 shown in FIG. 2. Preferably a plurality of gap sensing elements 24 are positioned around the periphery of the rotor assembly 14. The elements 24 constantly monitor the width of the air gap 16 between the electromagnet 18 and the spherical surface of the rotor assembly 14. Feedback signals from the elements 24 pass through an electrical circuit, not shown. In response to the feedback signals currents to the electromagnets 18 are adjusted to maintain the rotor assembly 14 in a levitated state with a desired air gap between the rotor assembly 14 and stator assembly 12.

The rotor assembly 14 and stator assembly 18 are coaxially positioned within the housing 20. The stator electromagnet 18 is supported around the rotor assembly 14 by the stator housing 20 and is clamped in place, as shown in FIG. 3, by a clamp ring 26. The stator electromagnet 18 has a E-shaped configuration formed by legs 28, 30 and 32 where each of the legs are formed by a stacked arrangement of E-shaped laminations 34 and 36/.

The laminations 34 and 36 project radially around the rotor assembly 14. The laminations 34 and 36 also extend longitudinally parallel to the rotational axis 37 of assembly 14. The planar surface of each lamination includes a line parallel to the axis of rotation 37 of the rotor assembly 14. Individually the laminations 34 extend to the air gap 16; while, the laminations 36 extend to a position further removed from the air gap 16 than the laminations 34 so as to provide a magnetic structure which wraps around the circumference of the rotor assembly 14. The entire stator electromagnet 18 is a laminated structure, and for purposes of clarity of illustrations, FIG. 2 illustrates only a portion of the laminations 34 and 36. Alternatively, laminations with a tapered cross section could be employed in lieu of laminations with differing radial dimension.

Supporting the extended laminations 34 is an magnetic member 38 having an L-shaped configuration, as shown in FIG. 2. A magnetizing coil 40 includes a plurality of turns 42, shown in FIG. 3, wrapped around the center leg 30 of electromagnet 18 and positioned in the slots formed by the legs 28, 30 and 32. The turns 42 may also be wrapped around the outer legs 28 and 32 in addition to around the center leg 30. Coil retention members 44 shown in FIG. 3, made of a nonmagnetic material and positioned near the air gap 16, are engaged by the E-shaped laminations 34 to maintain the windings 42 securely in the slots.

The L-shaped members 38 are positioned between the laminations 34 and the coils 40 and extend underneath the coils 40, as shown in FIG. 2. The end magnetic members 38 provide a path for the radial magnetic flux to flow uninterrupted in the area between the legs 28, 30, and 32 beneath the coils 40 and around the rotor assembly 14. This prevents the flux in a rotor flux carrying member generally designated by the numeral 48 on rotor assembly 14, shown in FIG. 3, from going to zero as the rotor assembly 14 rotates, thus reducing the hysteresis losses in the rotor magnetic flux carrying member 48.

In a preferred embodiment the polarity of the currents in each of the magnetizing coils 40, shown in FIG. 1, is chosen, so as to achieve a uniform magnetic pole orientation in electromagnetics 18. For example, the polarity of currents could be chosen so that the center poles are north poles and the outer poles are south poles. With this arrangement the orientation of flux in the rotor flux carrying member 48 is unidirectional. This substantially reduces the rotational losses due to hysteresis and eddy currents.

As illustrated in FIG. 3 the rotor assembly 14 includes a rotor shaft 46 with the magnetic flux carrying member 48, maintained on the shaft 46 oppositely of the stator electromagnet 18 by a retention member 50. The retention member 50 is welded to the shaft 46. The flux carrying member 48 includes two pairs of laminar ring-shaped disc magnetic members 52 surrounding a pair of laminar tape-wound magnetic members 54 respectively. Positioned above the magnetic members 54 and oppositely of the coil retention members 44 are ring members 56. The laminations of members 52 run in a vertical direction and the laminations of members 54 run in a horizontal direction as seen in FIG. 3. With this arrangement the direction of laminations is coincident with the direction of the flow of magnetic flux through the magnetic flux carrying members 52 and 54. This laminated configuration facilitates a rapid change of flux in the magnetic flux carrying member 48. As a result, the laminations on the rotor shaft 46 minimize the eddy current losses associated with flux variations and allow rapid rates of changes in the flux density.

Figures 4, 5:
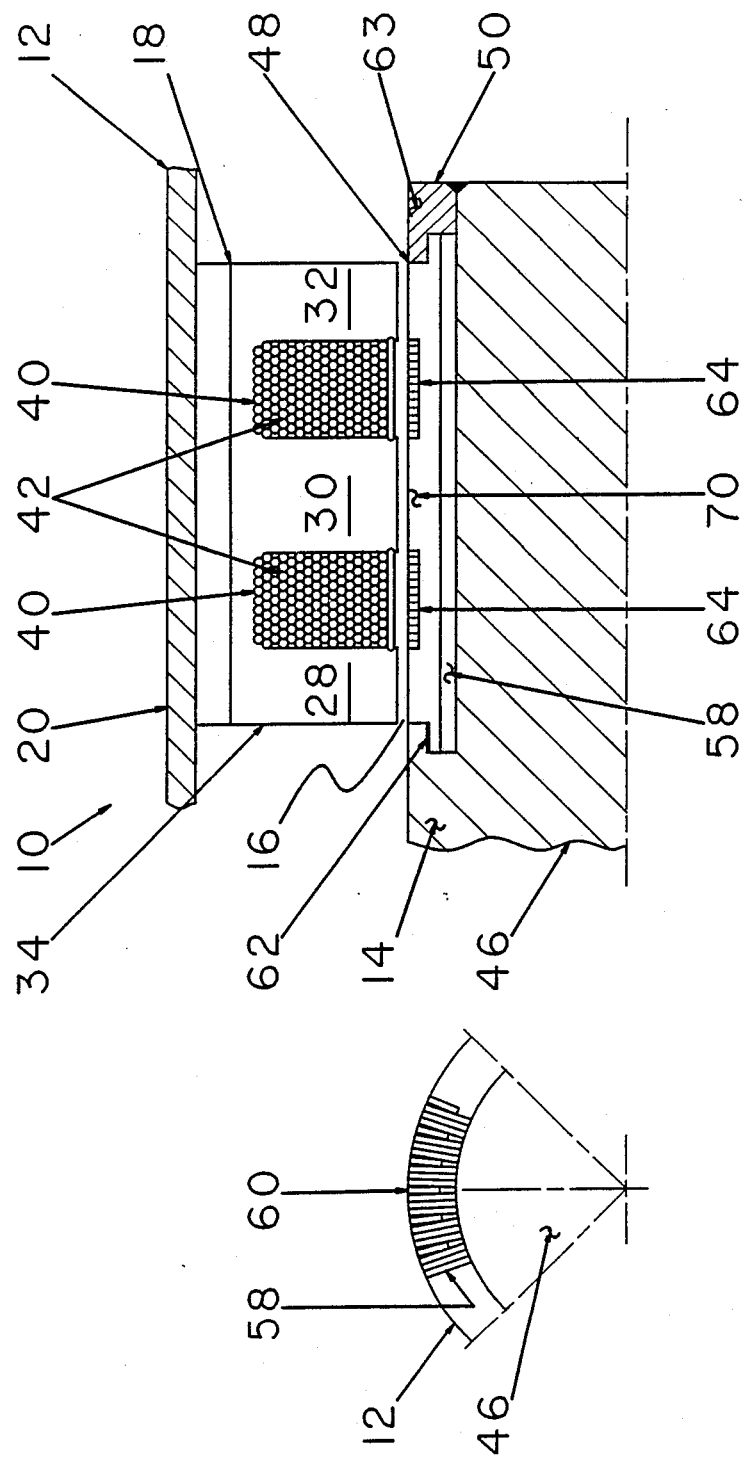
FIG. 4 is a sectional view similar to FIG. 3, illustrating an alternate embodiment of the rotor construction.
FIG. 5 is a schematic illustration of a radial segment of an alternate embodiment of the rotor construction shown in FIG. 4.

Now referring to FIG. 4, there is illustrated another embodiment of the rotor construction corresponding to the above-described arrangement shown in FIG. 2 and 3. Therefore, it should be understood that like numerals referred to in FIGS. 4 and 5 correspond to like parts described above and illustrated in FIGS. 1-3. With the arrangement shown in FIG. 4, the rotor shaft 46 includes a flux carrying member in the form of I-shaped rotor laminations 58 interspersed with I-shaped rotor laminations 60. As shown in greater detail in FIG. 5, laminations 58 have a radial length greater than the laminations 60. The laminations 58 and 60 are retained in place on the shaft 46 by a containment ring 62 associated with shaft 46 and retention member 50. Retention member 50 is welded to the shaft 46 and includes an annular shoulder 63 enveloping the ends of laminations 60. Rotor bandings 64 are located oppositely of the windings of the magnetizing coil 40 and provide additional retention of the rotor laminations 58 and 60. In low speed applications the rotor bandings 64 may not be needed.

Figures 6, 7:
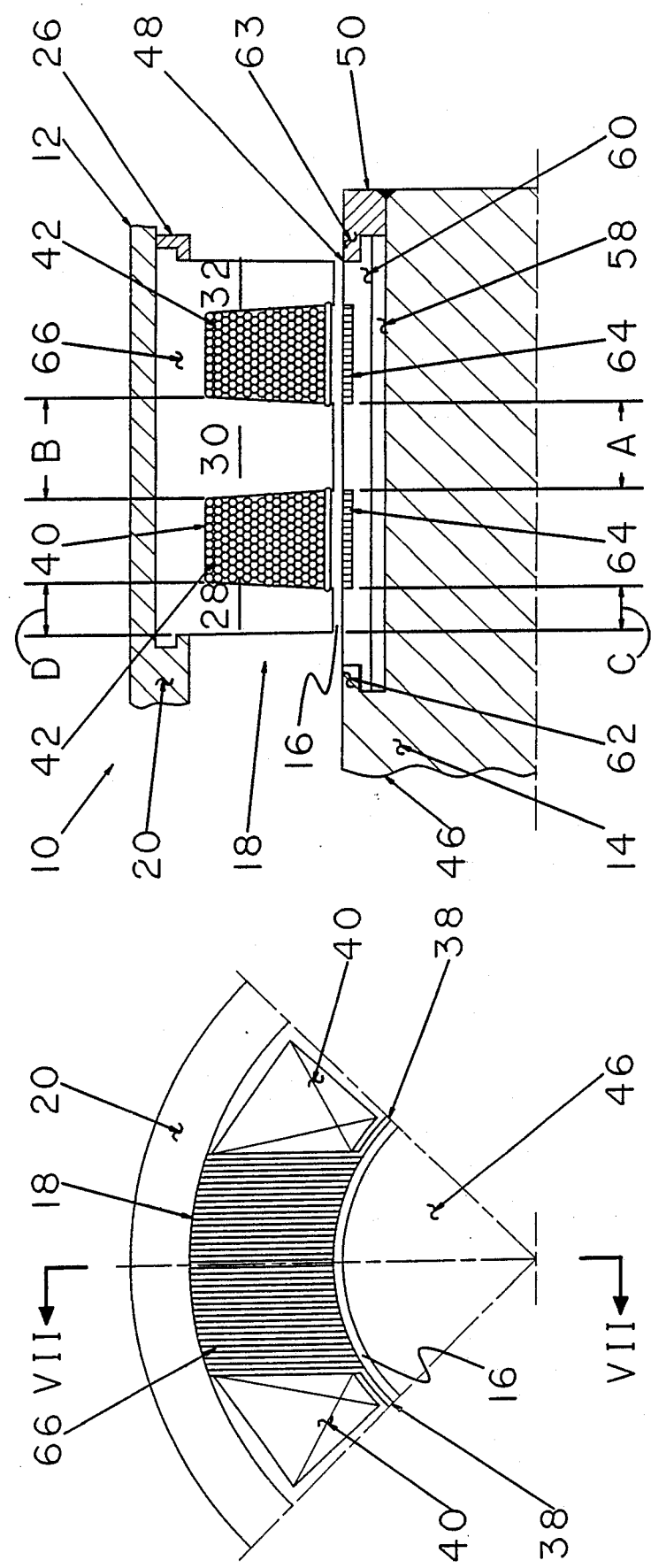
FIG. 6 is a schematic illustration of a sector of alternate stator construction of the magnetic bearing in accordance with the present invention.
FIG. 7 is an enlarged fragmentary sectional view taken along line VII—VII of FIG. 6, illustrating the details of the alternate stator construction.

Now referring to FIGS. 6 and 7, there is illustrated an additional embodiment of the stator construction of the present invention where again like numerals referred to in FIGS. 6 and 7 correspond to like parts described and illustrated in FIGS. 4 and 5. In FIG. 6 all of the E-shaped laminations 66 forming the stator electromagnet 18 extend from the housing 20 to the air gap 16 above the rotor magnetic flux carrying element 48. The laminations 66 are retained in place in surrounding relation with the magnetizing coil 40 by clamp ring 26.

The configuration of the E-shaped laminations in FIG. 7 differs from that illustrated in FIG. 4. As shown in FIG. 7, the configuration of the magnetizing coil 40 is defined by the dimensions "A" and "B" where "B" is greater than "A". Similarly pole 28 has a width "C" at the top of the pole and width "D" at the root of the pole, where "D" is greater than "C". This geometry serves to provide additional cross sectional area at the root of the pole which carries not only the magnetic flux passing into the rotor but also the lines of flux which leak across the slot. Also, the fully laminated structure of the stator electromagnet 18 facilitates rapid range of change of flux therein.

Figure 8:
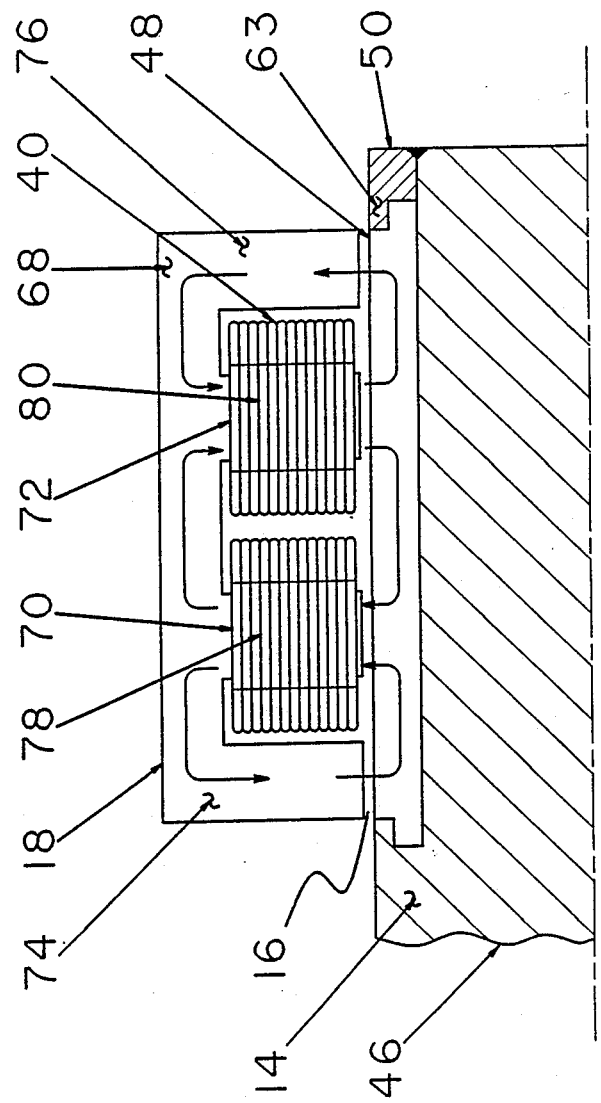
FIG. 8 is an enlarged fragmentary sectional view of an additional embodiment of the magnetic bearing of the present invention, illustrating a magnetic configuration with an increased number of poles.

Now referring to FIG. 8, there is illustrated a further embodiment of the stator electromagnet 18 formed by a plurality of laminations 68, having multiple center legs 70 and 72 and outer legs 74 and 76. The center legs 70 and 72 are surrounded by windings 78 and 80 of the magnetic coil 40. This arrangement also includes the above-described structure shown in FIG. 4 of retention member 50 welded to the rotor shaft 46 and having an annular shoulder 63 enveloping the end of magnetic flux carrying member 48. By using a plurality of center legs it is possible to achieve additional radial force capacity for a bearing of a given diameter relative to the single center leg configuration illustrated in FIGS. 3, 4 and 6.

Figure 9:
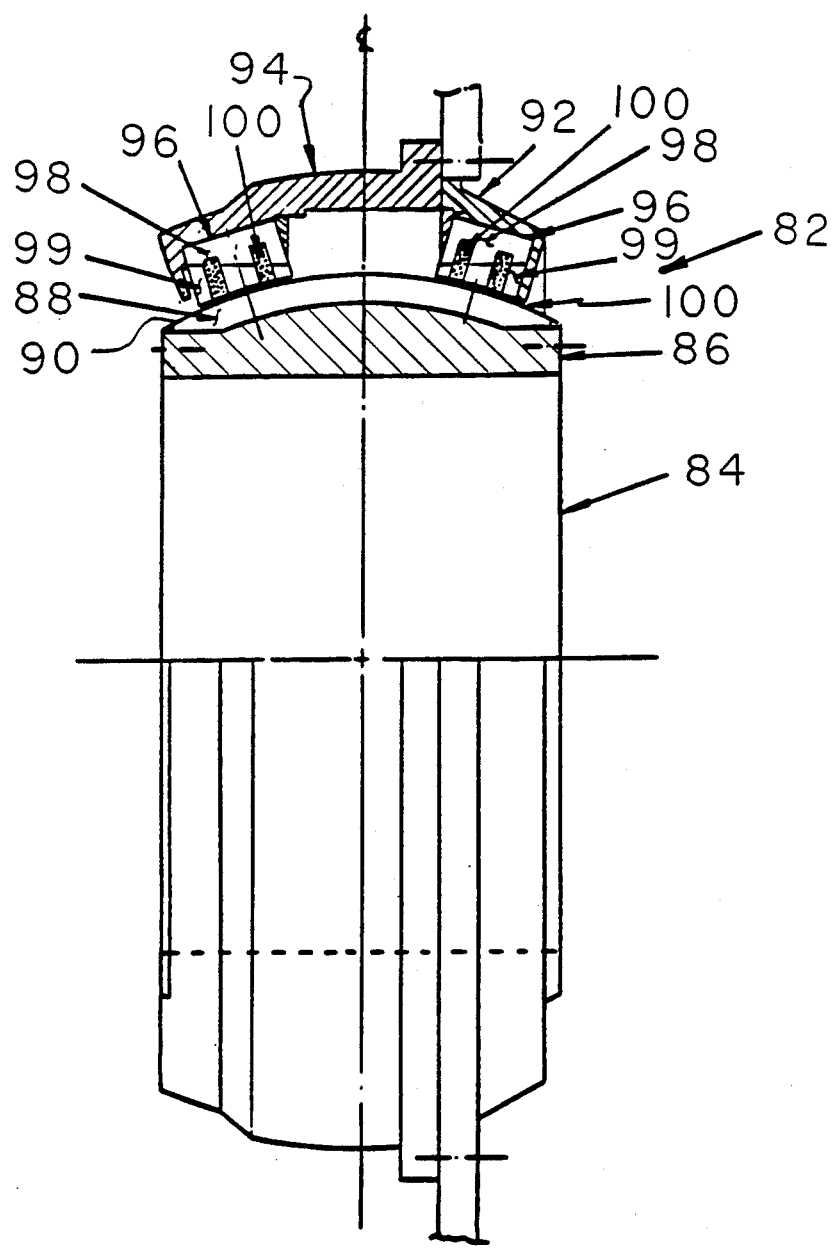
FIG. 9 is a fragmentary sectional view of spherical arrangement for the magnetic bearing of the present invention.

Further in accordance with the present invention there is illustrated a radial magnetic bearing generally designated by the numeral 82 in FIG. 9 having a spherical configuration corresponding to the spherical configuration of rotor assembly 84. The rotor assembly 84 includes a shaft 86 on which is positioned a magnetic flux carrying member 88, having a radial surface 90. Surrounding the flux carrying member 88 is a stator assembly 92 that includes a stator housing 94 for supporting stator electromagnets 96. Each stator electromagnet 96 is formed by a plurality of E-shaped laminations 98 having legs 99 that extend from the stator housing 94 to an air gap 100 above magnetic flux carrying member 88. The laminations 98 are secured within slots of the housing 94 in a position to maintain the laminations 98 spaced a selected distance from radial surface 90 of the magnetic flux carrying member 88. The stator electromagnets 96 formed by the laminations 98 include slots for receiving the windings of the magnetic coil.

According to provisions of the patent statutes, I have explained the principle, preferred construction and mode of operation of my invention and have illustrated and described what I now consider to represent its best embodiments. However, it should be understood that, within the scope of the appended claims, the invention may be practiced otherwise as specifically illustrated and described.

I claim:

1. A magnetic bearing for rotatably supporting a rotor element comprising, a magnetic flux carrying member carried by the rotor element, a stator element surrounding in spaced relation said magnetic flux carrying member, a plurality of at least three electromagnets supported by said stator element around the periphery of said magnetic flux carrying member to generate a force of attraction on the rotor element, each of said electromagnets being formed by a plurality of planar laminations extending longitudinally parallel to the axis of rotation of the rotor element, each of said laminations having a plurality of legs forming pole tips positioned in close proximity to the surface of said magnetic flux carrying member to form an air gap therebetween, magnetizing coils extending around said legs of said laminations, power means for supplying said magnetizing coils with electrical currents to generate magnetic forces upon said magnetic flux carrying member, and means associated with said magnetic flux carrying member for minimizing eddy current losses in the rotor and allow rapid rates of change in flux density.

2. A magnetic bearing as set forth in claim 1 which includes, said laminations having an E-shaped configuration and stacked in an arrangement extending radially around the axis of rotation of the rotor element, and said laminations each having an outer radial surface positioned oppositely of said magnetic flux carrying member to form said air gap therebetween.

3. A magnetic bearing as set forth in claim 2 in which, each of said laminations includes legs separated from one another by slots, and said magnetizing coils extending around said legs and positioned in said slots.

4. A magnetic bearing as set forth in claim 1 which includes, means for maintaining said magnetizing coils securely in place around said laminations.

5. A magnetic bearing as set forth in claim 1 which includes, said magnetic means extending circumferentially around said rotor element for providing a path for the radial magnetic flux to flow uninterrupted around said rotor element.

6. A magnetic bearing as set forth in claim 1 which includes, means for maintaining said magnetic flux carrying member on the rotor element oppositely of said electromagnets.

7. A magnetic bearing as set forth in claim 1 in which, said magnetic flux carrying member includes a plurality of laminations surrounding the rotor element where the direction of laminations is coincident with the direction of the flow of magnetic flux through said magnetic flux carrying member.

8. A magnetic bearing as set forth in claim 1 in which,
said magnetic flux carrying member includes I-shaped laminations extending around the rotor element, and
means for retaining said laminations on said rotor element oppositely of said electromagnets.

9. A magnetic bearing as set forth in claim 1 in which,
said magnetic flux carrying member includes a plurality of I-shaped rotor laminations extending radially around the rotor element, and
means for retaining said rotor laminations in place on the rotor element oppositely of said electromagnet.

10. A magnetic bearing as set forth in claim 1 in which,
each of said electromagnet laminations has an E-shaped configuration including at least one leg for receiving turns of said magnetizing coils closely adjacent the surface of said magnetic flux carrying member, and
said laminations including an enlarged cross sectional area removed from close proximity to said magnetic flux carrying member for carrying magnetic flux.

11. A magnetic bearing as set forth in claim 1 in which,
each of said electromagnet laminations has a plurality of leg members for receiving the turns of said magnetizing coil to generate radial magnetic forces on the rotor element.

12. A magnetic radial force actuator comprising,
a stator housing,
a rotor positioned relative to said stator housing, said rotor having an outer radial surface,
a magnetic flux carrying member extending around said rotor within said stator housing,
a plurality of at least three electromagnets supported by said stator housing and spaced around the periphery of said rotor in overlying relation with said magnetic flux carrying member to generate forces of attraction on said rotor,
each of electromagnets including a structure formed by a stacked arrangement of laminations having an E-shaped cross-sectional configuration and extending longitudinally parallel to the axis of rotation of the rotor element,
said laminations positioned radially around the rotor and forming a plurality of pole tips positioned in close proximity to the surface of said magnetic flux carrying member to form an air gap therebetween,
magnetizing coils extending around said E-shaped laminations, and
power means for supplying said magnetizing coils with electrical current to generate a magnetic force upon said magnetic flux carrying member.

13. A magnetic radial force actuator as set forth in claim 12 in which,
each of said E-shaped laminations has a planar surface containing a line parallel to the axis of rotation of said rotor.

14. A magnetic radial force actuator as set forth in claim 12 in which,
each of said E-shaped laminations includes a plural of legs extending from said stator housing to said pole tips,
said legs being spaced apart to form slots,
said magnetizing coils extending around said legs and positioned in said slots, and
means positioned adjacent said pole tips for maintaining said magnetizing coils in said slots.

15. A magnetic radial force actuator as set forth in claim 12 in which,
said magnetic flux carrying member includes a plurality of laminations surrounding said rotor where the direction of laminations is coincident with the direction of the flow of magnetic flux through said magnetic flux carrying member.

* * * * *

UNITED STATES PATENT AND TRADEMARK OFFICE
CERTIFICATE OF CORRECTION

PATENT NO. : 4,983,870

DATED : January 8, 1991

INVENTOR(S) : Lloyd W. McSparran

It is certified that error appears in the above-identified patent and that said Letters Patent is hereby corrected as shown below:

In column 1, line 68, after 'three', delete "electromagnetics" and insert --electromagnets--.
    In column 2, line 6, after 'element.', delete "EAch" and insert --Each--.
    In column 2, line 13, after 'member.' and beginning with "Further", begin a new paragraph.
    In column 2, line 48, after 'having', delete "an".
    In column 2, line 68, after '2.', delete "5".
    In column 2, line 68, beginning with "FIG. 4", begin a new paragraph.
    In column 3, line 58, after '36', delete "/".
    In column 4, line 7, after 'an', insert --end--.
    In column 4, line 33, after 'chosen', delete ",".
    In column 4, line 34, after 'in', delete "electromagnetics" and insert --electromagnets--.
    In column 6, (claim 2) line 7, after 'an', delete "outer" and insert --inner--.
    In column 8, (claim 14) line 3, after 'a', delete "plural" and insert --plurality--.

Signed and Sealed this

Eighteenth Day of February, 1992

Attest:

HARRY F. MANBECK, JR.

*Attesting Officer*      Commissioner of Patents and Trademarks